US008831015B2

(12) United States Patent
Petrovic et al.

(10) Patent No.: US 8,831,015 B2
(45) Date of Patent: Sep. 9, 2014

(54) MOCA-WIFI MULTIPLEXING

(75) Inventors: Branislav Petrovic, La Jolla, CA (US);
Changwen Liu, San Diego, CA (US);
Zong Liang Wu, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 82 days.

(21) Appl. No.: 13/213,370

(22) Filed: Aug. 19, 2011

(65) Prior Publication Data
US 2012/0287866 A1 Nov. 15, 2012

Related U.S. Application Data

(60) Provisional application No. 61/484,642, filed on May 10, 2011.

(51) Int. Cl.
H04L 29/06 (2006.01)
H04W 74/04 (2009.01)
H04L 12/28 (2006.01)
H04W 28/04 (2009.01)
H04W 84/22 (2009.01)

(52) U.S. Cl.
CPC ........... *H04W 74/04* (2013.01); *H04L 12/2803* (2013.01); *H04L 12/2801* (2013.01); *H04W 84/22* (2013.01)
USPC ............................. 370/401; 370/402; 370/329

(58) Field of Classification Search
CPC .......................... H04W 74/04; H04W 56/0015
USPC .................. 370/252, 337, 400, 401, 329, 402
See application file for complete search history.

(56) References Cited

U.S. PATENT DOCUMENTS

| 2006/0104291 | A1* | 5/2006 | Rodriguez et al. ............ 370/401 |
| 2007/0030854 | A1* | 2/2007 | Lin et al. ....................... 370/401 |
| 2007/0217436 | A1 | 9/2007 | Markley et al. |
| 2008/0144586 | A1* | 6/2008 | Kneckt et al. ................. 370/337 |
| 2009/0067441 | A1 | 3/2009 | Ansari et al. |
| 2009/0092154 | A1 | 4/2009 | Malik et al. |
| 2010/0142378 | A1 | 6/2010 | Matheney et al. |
| 2010/0142540 | A1* | 6/2010 | Matheney et al. ............ 370/400 |
| 2011/0205924 | A1* | 8/2011 | Gonikberg et al. ........... 370/252 |

OTHER PUBLICATIONS

Patent Cooperation Treaty, International Search Report for Application No. PCT/US2012/037023, Aug. 7, 2012, pp. 1-2.

* cited by examiner

*Primary Examiner* — Helal A Algahaim
*Assistant Examiner* — Mahmoud Ismail
(74) *Attorney, Agent, or Firm* — Richard Bachand; Bruce Greenhaus; Sheppard Mullin Richter & Hampton LLP

(57) ABSTRACT

Systems, methods, and apparatus for sharing resources for a network bridge configured to perform communications on a MoCA network and a WiFi network using the shared resources. The method includes: receiving a MAP from a MoCA NC and checking the MAP to determine whether the MoCA NC has scheduled MoCA communications in an upcoming MAP cycle; in instances where the MAP indicates that the MoCA NC has scheduled MoCA communications in an upcoming MAP cycle, configuring the shared network bridge resources for MoCA communications: in instances where the MAP indicates that the MoCA NC has not scheduled any MoCA communications in an upcoming MAP cycle, configuring the shared network bridge resources for WiFi communications; at the conclusion of a WiFi communication period, sending a CTS to the WiFi devices an the network and configuring the shared network bridge resources for WiFi communications.

17 Claims, 15 Drawing Sheets

MOCA-WIFI MULTIPLEXING

CROSS-REFERENCE TO RELATED APPLICATIONS

This application claims the benefit of U.S. Provisional Application No. 61/484,642, filed May 10, 2011, which is herein incorporated by reference in its entirety.

FIELD OF THE DISCLOSED METHOD AND APPARATUS

The disclosed method and apparatus relates generally to communication networks, and more particularly, some embodiments relate to systems and methods for sharing MoCA and WiFi resources.

DESCRIPTION OF THE RELATED ART

A home network may include several types of devices that provide subscriber services throughout a home. These subscriber services include delivering multimedia content, such as streaming audio and video, to devices located throughout the home. As the number of available subscriber services has increased and they become more popular, the number of devices being connected within each home network has also increased. With increasing devices delivering and accessing multimedia content in the home, the number and types of networks over which such content is shared has also increased.

The network of FIG. 1 is one example of a Multimedia over Coax Alliance (MoCA) network implemented in a home. In this example, a wired communications medium 100 is shown. The wired communications medium 100 might be a coaxial cable system, a power line system, a fiber optic cable system, an Ethernet cable system, or other similar communications medium. Alternatively, the communications medium 100 might be a wireless transmission system. In one embodiment of FIG. 1, the communications medium 100 is preinstalled coaxial cabling deployed within a residence 101.

The network of FIG. 1 comprises a plurality of network nodes 102, 103, 104, 105, 106 in communication according to a communications protocol. For example, the communications protocol might conform to a networking standard, such as the well known MoCA standard. In the example of FIG. 1, the communications protocol specifies a packet based communications system.

In some cases, activity on the network is controlled by a Network Coordinator (NC). In such networks, the NC manages access to the shared communications medium and manages the "quality-of-service" (QoS) of transmissions on the network. QoS generally refers to the reliability of the access to the medium that devices attempting to transmit information on the network will have.

In one case, one of the nodes is selected to perform the functions of the NC based upon a process defined by the communications protocol. For example, in a MoCA network, the first node to communicate over a communication medium will search to see whether any other node is already performing the functions of the NC. Being the first node, there will not be another node yet on the network. Accordingly, the first node will become the NC. When a second node does a similar search, the first node will be sending out a beacon that will be detected by the second node. An admission process will occur between the nodes according to the admission procedures of the MoCA protocol. The result of the admission process will be the admission of the second node to the network. The NC also performs admission procedures as each other new node requests admission to the network. In one such case, after two or more nodes form the network, a protocol is used to select which node will continue to function as the NC by using a set of well defined criteria.

In some networks employing an NC, the NC schedules network communications between network nodes using a Media Access Plan (MAP). The MAP is sent as a packet. Such MAP packets are sent on a regular basis. MAPs schedule all of the traffic on the medium 100. That includes scheduling the times during which nodes can transmit. Transmit times for data packets are scheduled by the NC in response to reservation requests (RRs) by the nodes of the network. The NC may also schedule control and management packets on its own (without receiving a RR from another node).

With continued reference to FIG. 1, one of the nodes 102 serves as a network communications module (e.g., a MoCA node). The node 102 is coupled to one of the computers 109. Such nodes 102 allow the computers 109 to communicate on the communications medium 100 in accordance with the communications protocol used on the medium 100. One node 106 is shown as a module associated with a television 111 to allow the television 111 to receive and display media streamed from one or more other network nodes. Alternatively, a node can be associated with (i.e., coupled to or integrated into) a speaker or other music or video device 103. A node can also be associated with a module configured to interface with an internet or cable service provider 112, for example to provide Internet access, digital video recording capabilities, media streaming functions, or network management services to the residence 101.

Some proponents of wireless networks have claimed that the video content needs of an entire household can be serviced entirely with a WiFi network. However this has not always proven to be practical, or even possible in some circumstances. Even with contemporary multiple-input multiple-output (MIMO) systems such as 802.11n, limitations on providing high enough data rates to large numbers of devices hinder practical use. Therefore, with the proliferation of devices, it is becoming more commonplace to use multiple networks to service the growing number of devices in a home or like setting. For example, in some environments, combinations of hardwired and wireless networks are used to service all the devices to which the user desires to connect. As a further example, some implementations use the combination of a MoCA network with a WiFi network share content among a plurality of devices in a home. In such environments, the MoCA network can be used for longer runs, such as to run from the initial cable drop to each room or group of rooms in the network space. At each room (or group of rooms) a WiFi router can be provided as an access point to communicate to the group of devices in that space.

FIG. 2 is a diagram illustrating an example of a home networking environment using a combination of a wired network and a wireless network. The example illustrated in FIG. 2 is similar to FIG. 1, but shows the second-story rooms as having a bridge 113, 114 between the wireless and wired networks. Particularly, this example shows bridges 113, 114 that can communicate with the MoCA backbone and can also communicate wirelessly to wireless 802.11 network devices. Examples of wireless network devices with which bridges 113, 114 can communicate include televisions 107, 109, 112, 115, 116, 117. In this example, bridges 113, 114 may also communicate with other wireless devices 1116, 1117, 1118, 1119, 1120, which can include, for example, DVD players, gaming consoles, computers, smart phones, tablets, and other content devices with wireless networking capabilities.

FIG. 3 is a diagram illustrating an example configuration of a bridge 300 between two networks having two separate systems mutually communicating via a standard interface. In the example illustrated in FIG. 3, network 1 is a MoCA network and network 2 is a WiFi network. The transmit/receive chain for the MoCA network includes a transceiver 131, appropriate amplification, including power amplifiers and low noise amplifiers 141, and a diplexer 137. Likewise, the transmit/receive chain for the WiFi network includes transceivers 132, 133, 134, amplifiers 142, 143, 144, a diplexer 138 and filter 139. In this example, transceivers 132, 133, 134 include a 2.4 GHz transceiver and two 5 GHz transceivers. An interface 140 can be included to allow communications between MoCA baseband 121 and WiFi baseband 122. Examples of interface 140 can include RGMII, GMII, MII, TMII (double clocked MII), PCI, and the like. Although not illustrated, the bridge 300 can also include additional communication interfaces to communicate with devices through means other than via the associated networks.

BRIEF SUMMARY

Various embodiments of the systems, methods, and apparatuses are disclosed for sharing resources in a network bridge configured to perform communications on a Multi-media over Coax Alliance (MoCA) network and a WiFi network. In various embodiments, the process includes: (1) in an access cycle of the MoCA network, receiving a Media Access Plan (MAP) from a MoCA Network Coordinator (NC) on the MoCA network and checking the MAP to determine whether the MoCA NC has scheduled MoCA communications in an upcoming MAP cycle; (2) in instances where the MAP indicates that the MoCA NC has scheduled MoCA communications in an upcoming MAP cycle, configuring the shared network bridge resources for MoCA communications; (3) in instances where the MAP indicates that the MoCA NC has not scheduled any MoCA communications in an upcoming MAP cycle, configuring the shared network bridge resources for WiFi communications; and (4) at the conclusion of a WiFi communication period, sending a Clear-to-Send (CTS) to the WiFi devices on the network and configuring the shared network bridge resources for MoCA communications (e.g. sending MAPs).

In various embodiments, checking the MAP to determine whether the MoCA NC has scheduled MoCA communications in an upcoming MAP cycle includes parsing the MAP to determine a time period for scheduled MoCA communications.

The process can further include, upon configuration of the shared network bridge resources for WiFi communications, checking for the occurrence of WiFi communications and, if WiFi communications do not occur within a predetermined time period, sending a CTS to the WiFi devices on the network and configuring the shared network bridge resources for MoCA communications. The predetermined time period, in some embodiments, may be chosen to ensure that they can be completed before the next scheduled MAP.

In some embodiments, the process also includes, when the shared resources are configured for WiFi communications, sending a CTS before each MAP and RR to cease WiFi communications, and reconfiguring the shared resources for MoCA communications to allow communication of the MAPs and RRs among MoCA devices. The process may further include communicating with a second network bridge to coordinate WiFi communications by the bridges to avoid overlapping WiFi communications by the bridges. Resources that can be shared can include a baseband processor, memory, a transceiver, a power amplifier and a low noise amplifier.

Other features and aspects of the disclosed method and apparatus will become apparent from the following detailed description, taken in conjunction with the accompanying drawings, which illustrate, by way of example, the features in accordance with embodiments of the disclosed method and apparatus. For example, though example embodiments presented herein are described in relation to network layer 2 and UPnP, one of ordinary skill in the art will understand that the features and functionality of the disclosed method and apparatus can be implemented using other network layers and messaging protocols. The summary is not intended to limit the scope of the invention, which is defined solely by the claims attached hereto.

BRIEF DESCRIPTION OF THE DRAWINGS

The disclosed method and apparatus is described in detail with reference to the following Figures. The drawings are provided for purposes of illustration only. Accordingly, these drawings shall not be considered limiting of the breadth, scope, or applicability of the claimed invention. Note that for clarity and ease of illustration, these drawings are not necessarily made to scale.

DETAILED DESCRIPTION

The disclosed method and apparatus is directed to systems and methods for efficiently using resources when communicating over different network types. Particularly, some embodiments are directed toward systems and methods for sharing resources between two systems of a network bridge. Even more particularly, some embodiments are directed toward systems and methods for sharing resources between two systems of a network bridge supporting WiFi and Multimedia over Coax Alliance (MoCA) networks. In various embodiments, the methodologies implemented to allow sharing of network bridge resources are implemented in a manner that allows the WiFi and MoCA devices to continue to operate in accordance with their respective standards. In other words, no changes to the respective network standards are required.

For example, in some embodiments, the network bridge interacts with the MoCA and WiFi devices in such a way that these devices continue to operate in accordance with their own network protocols. The bridge implements the sharing arrangement. For example, as further described below, in some embodiments the bridge relies on Media Access Plans (MAPs) from the MoCA network to determine when the MoCA devices will not be operating on the network. During these "free times", the bridge configures itself to handle WiFi communications in accordance with WiFi protocols. To free the shared resources for subsequent WiFi operations, the bridge sends a Clear-to-Send (CTS) message to the WiFi devices, which signals to them in their native protocol that they should yield network time. This frees the resources for MoCA communications.

Figure 1:
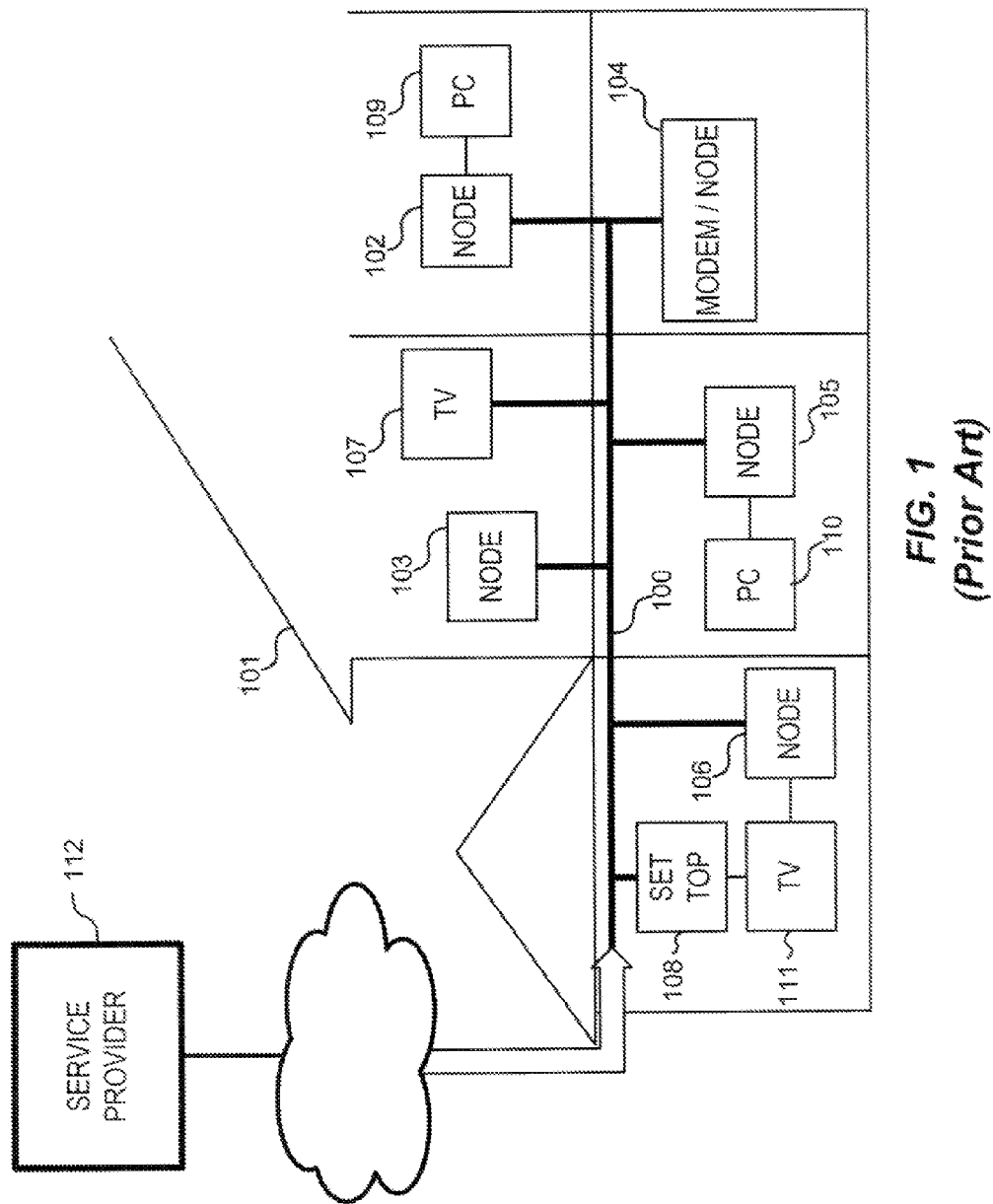
FIG. 1 is one example of a Multimedia over Coax Alliance (MoCA) network implemented in a home.
Figure 2:
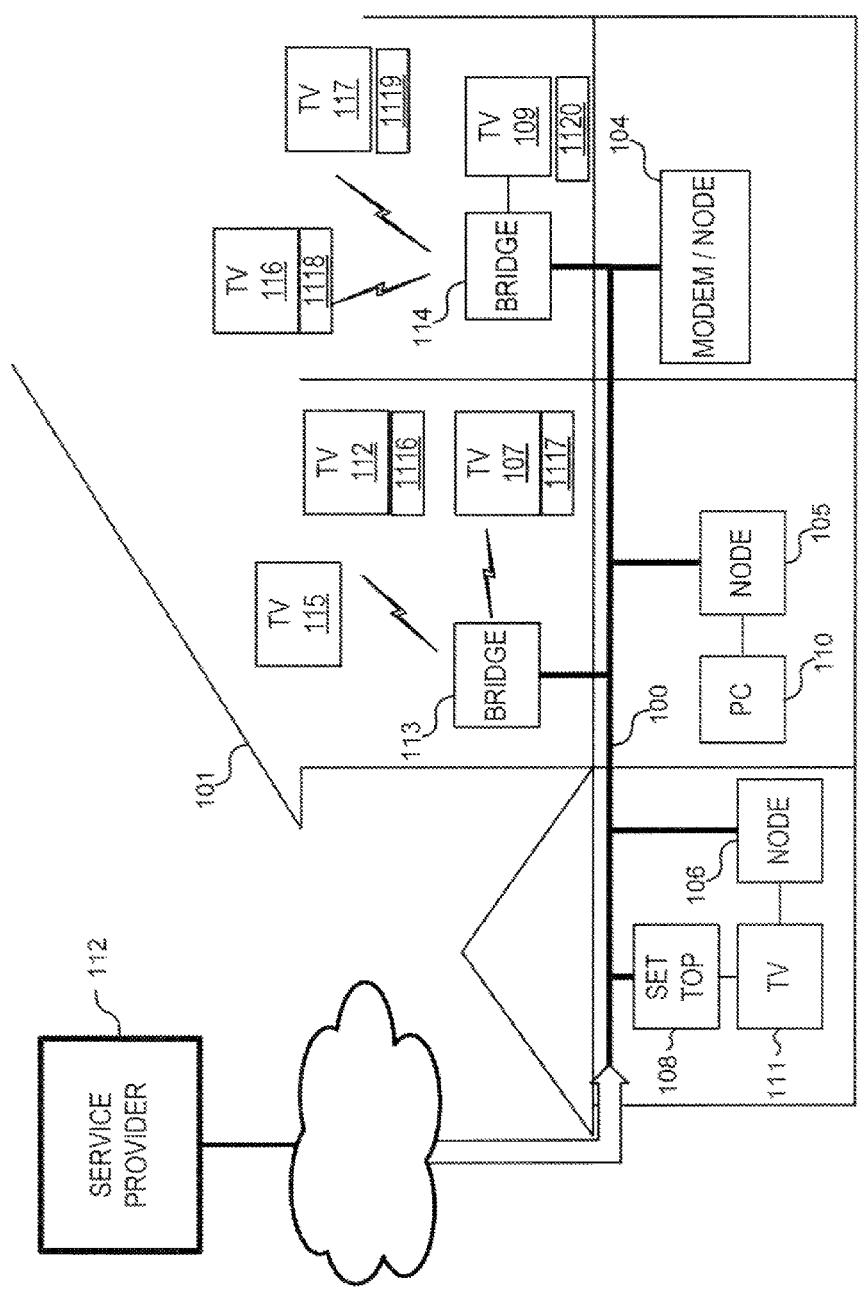
FIG. 2 is a diagram illustrating an example of a home networking environment using a combination of a wired network and a wireless network.
Figure 3:
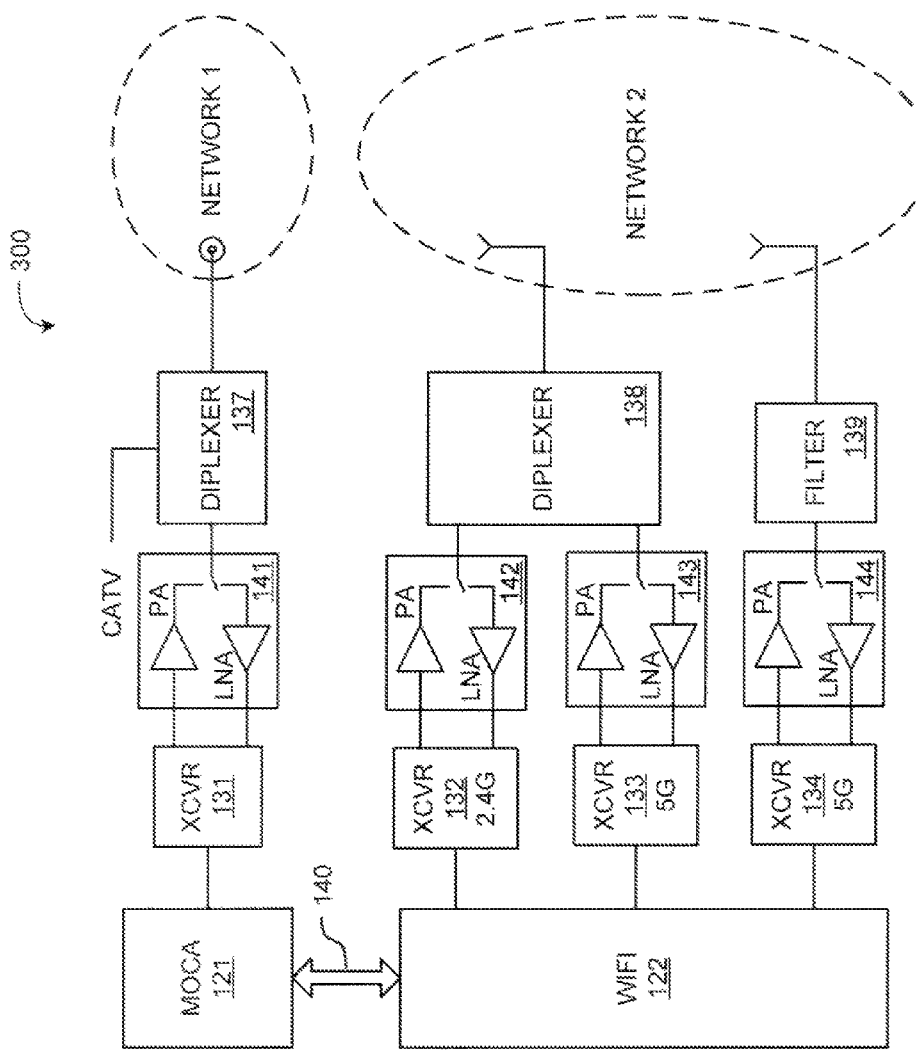
FIG. 3 is a diagram illustrating an example configuration of a bridge 300 between two networks having two separate systems mutually communicating via a standard interface.
Figure 4:
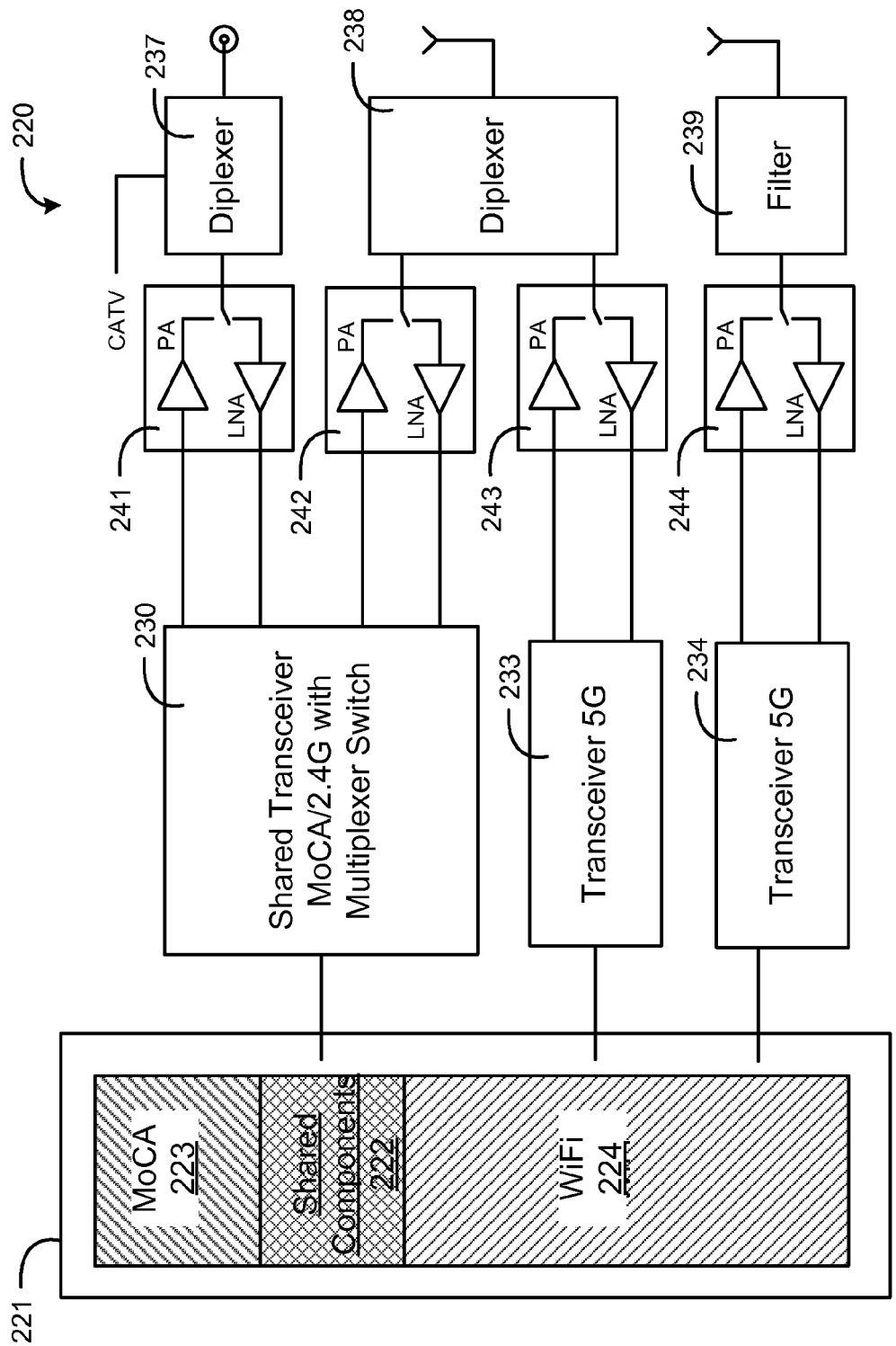
FIG. 4 is a diagram illustrating an example of resource sharing in a network bridge in accordance with one embodiment of the systems and methods described herein.

FIG. 4 is a diagram illustrating an example of resource sharing in a network bridge in accordance with one embodiment of the systems and methods described herein. As illustrated in FIG. 4, the bridge 220 includes a baseband component 221. In the case of a bridge for MoCA and WiFi networks, the baseband component 221 includes a MoCA baseband module 223 and a WiFi baseband module 224. As can be seen from FIG. 4, certain of the components of MoCA baseband module 223 and of the WiFi baseband module 224 are shared, as illustrated by the shared components 222. Some of the benefits that may be obtained in some embodiments by sharing components among MoCA baseband 223 and WiFi baseband 224 include, reduced cost, reduced silicon real estate, and lower power consumption. Examples of components that can be shared include memory, processor, other digital hardware, Digital Signal Processor (DSP), and some interfaces.

The bridge 220 also includes transceivers 230, 233, 234, amplifiers 241, 242, 243, 244, diplexers 237, 238, and a filter 239. As will be apparent to one of ordinary skill in the art, the baseband component 221 can include, for example, one or more processors, memory, interfaces, bus, power management/conditioning and other baseband components. Processing components of a baseband chip or chipset can include for example, a general-purpose processor, a digital signal processor, a communication core, and an application core. The interfaces can include, for example, a Universal Asynchronous Receiver/Transmitter (UART), Serial Peripheral Interface (SPI), and other interfaces.

The example illustrated in FIG. 4 also shows the sharing of Radio Frequency (RF) components for the WiFi and MoCA transmit/receive chains. Particularly, this example illustrates a shared transceiver 230 that is shared between the MoCA network and the WiFi network. More particularly, in this example a single transceiver is shared between the MoCA network and the 2.4 GHz communication path for the WiFi network.

Because the two networks in this example operate in different bands, there may be trade-offs between savings gained by removing duplication of transceiver components and performance lost due to the need to implement a broadband transceiver to cover multiple frequency bands. In the example of FIG. 4, the shared transceiver 230 operates in the frequency bands of both the MoCA network and the 2.4 GHz WiFi network. In some embodiments, the transceiver is implemented as a wideband transceiver operating across a frequency band wide enough covering all channels in both bands. Such transceivers may be implemented to cover all channels in both bands without the need for switching or tuning. In other embodiments, the instantaneous bandwidth of the transceiver 230 is narrower, but the transceiver 230 is capable of operating across a wider frequency band. For instance, the operation in different bands and channels may be achieved in various embodiments by tuning or switching components or blocks of the transceiver. Preferably, such switching or tuning is performed with sufficient speed so as to not significantly impact network communications as a result of timesharing the transceiver 230. Although not illustrated in the example of FIG. 4, a transceiver can also be implemented and shared among other combinations of transceivers including among the MoCA network and the WiFi 5 GHz networks. However, sharing the MoCA network transceiver with transceivers for the WiFi 5 GHz networks requires a wider operational bandwidth of the transceiver. As with the example described in FIG. 4, the wider operational bandwidth can be accomplished, for example, with a wideband transceiver, through tuning or through switching of components or blocks configured to handle the appropriate frequency bands.

Various embodiments can be implemented with a variety of sharing options. For example, in some embodiments, the sharing can be a "dynamic sharing" or a "static sharing". Dynamic sharing can be implemented to allow simultaneous operation of MoCA and WiFi communications through a real-time multiplexing scheme between the two networks. In some embodiments, the WiFi communications are operated between MoCA MAP cycles (1 ms repetition) with no change in the MoCA standard protocols. In other embodiments, WiFi communications are operated during one or multiple MoCA MAP cycles. For example, WiFi communications can be allowed to take place during time intervals that are not reserved by MoCA devices. In other embodiments, WiFi communications may be permitted to preempt MoCA communications. Limits can be placed on such preemption to prevent or minimize the occurrence of WiFi dominating the communication bandwidth. Likewise, MoCA communications may be given this priority. Although operating WiFi communications over multiple MoCA MAP cycles can lead to a higher efficiency, the MoCA protocol in some embodiments may be altered to allow a leave of absence for MoCA devices.

For static sharing options, the shared components in some embodiments are configured for either the MoCA mode or the WiFi mode, using only one service at a time. Static sharing can allow a full performance for each mode of operation in the allotted time interval, but may lead to lower cost advantage as compared to dynamic sharing. With static sharing, the node is limited to one service at a time and cannot be a wire-fed access point in a WiFi mode. One advantage of static sharing is that when the node is servicing a particular mode, that mode gets full service.

Although FIG. 4 illustrates sharing of baseband components and some transceiver components, different levels of sharing can be implemented. Typically, for embodiments in which network access is on a strict time division basis, resource sharing can be maximized. That is, in implementations where WiFi is suspended for a period on-demand during the MoCA time slots, and MoCA is suspended for a period on-demand during WiFi timeslots, the system components can be dedicated to one network at a time and sharing can be maximized. In embodiments where fewer than all components are shared, there may be some simultaneous, or effectively simultaneous, communications across both networks. For example, where there is sharing of the processor and memory but not of the RF front end, near real-time processing of WiFi packets and near real-time processing of MoCA packets can be performed by the processor while each packet type can be communicated using the still dedicated front end. Likewise, with shared memory, the memory can handle simultaneous accesses to different addresses of the memory by WiFi and MoCA. In some embodiments, fine lock-synchronization or software transactional memory may be used to facilitate memory sharing.

For dynamic sharing using simultaneous or apparently simultaneous communications, various techniques can be used based on the Media Access Control/Physical Layer (MAC/PHY) protocols for the network schemes.

Figure 5:
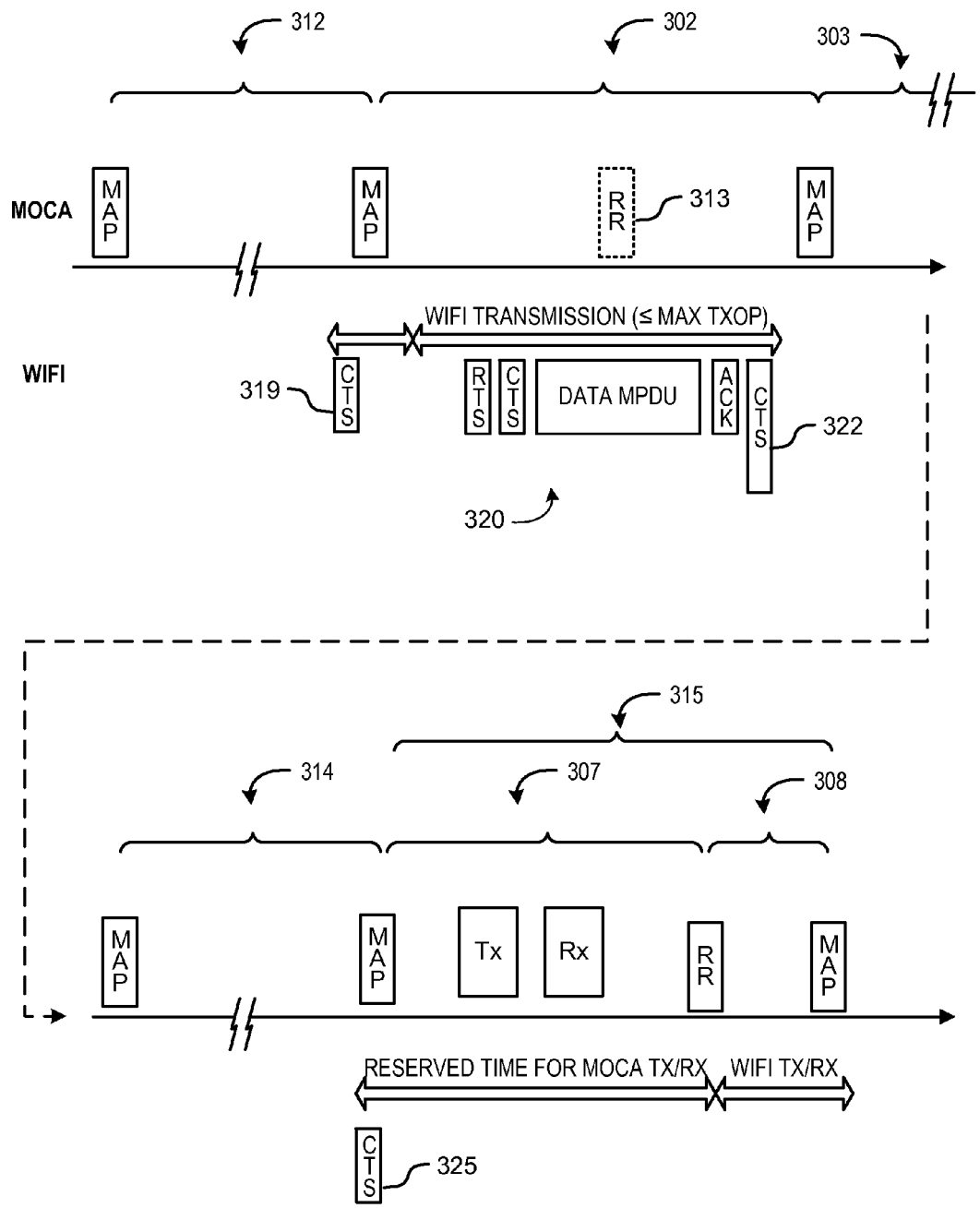
FIG. 5 is a diagram illustrating an example for microsharing among WiFi and MoCA communications in accordance with embodiments of the systems and methods described herein.

FIG. 5 is a diagram illustrating an example for microsharing among WiFi and MoCA communications in accordance with embodiments of the systems and methods described herein. First, consider the standard MoCA MAC/PHY protocol. The standard MoCA MAC/PHY protocol specifies a packet-based communications system. PHY packets comprise preambles and payloads. A PHY preamble is typically inserted at the beginning of each packet to assist receivers in detecting and acquiring the physical layer parameters to decode the packet properly. The communications protocol may have a plurality of pre-defined PHY preambles to use with different types of network communications. For example, one type of preamble may be used when transmitting in a diversity mode (a communication mode in which little is known about the communication channel). Another type of preamble may be used when transmitting a media access plan (MAP) message. Other types of packets may use other types of preambles.

A PHY payload is used to transmit the data content of the packet. In some cases, the PHY payload has a predetermined format. For example, in a MoCA network, network maintenance messages and MAP messages each have a format that is determined by the MoCA protocol. In other cases, the PHY payload may have an undetermined format. For example, the PHY payload of a media streaming transmission might comprise an embedded Ethernet packet or a portion thereof.

Activity on the MoCA network is controlled by a network coordinator (NC). Often, a node is selected from among the nodes of the network to be the NC. Accordingly, the selected node performs the functions of the NC. The node is selected based upon a process defined by the communications protocol. In networks employing an NC, the NC schedules network communications between network nodes using a MAP cycle. The MAP is sent as a packet. Such MAP packets are sent on a regular basis. MAPs are generated in response to reservation requests (RRs) sent by the nodes of the network.

This process can be described with reference to FIG. 5. According to MoCA, when a MoCA node has data to communicate during an upcoming map cycle it sends an RR indicating its desire to communicate data during the upcoming MAP cycle. The next MAP specifies the grants for such RRs. As shown in FIG. 5, the MAP indicates that the node has data to send or to receive during the upcoming MAP cycle 303. Where no grants for transmissions and receptions to a node are in the MAP, most of the upcoming MoCA MAP cycle (except the time interval of the next MAP transmission) should be unused. Accordingly, shared resources should thus be free for use for WiFi communications. In the example illustrated in FIG. 5, no grants in the last two MAPs for transmissions (except RR) and receptions by a node are present during time interval 312. Accordingly, the next map-to-map interval 302 will be unused by MoCA resources. Accordingly, these resources can be used for WiFi transmissions during map-to-map interval 302. On the other hand, because grants at the MAP at the end of the interval 302 is detected, is anticipated that the MoCA network will be used for communications during map cycle 303.

Because, as illustrated in the example of FIG. 5, no transmissions or receptions were granted for the map-to-map interval 312, the baseband module 220 recognizes that there will be available network time. Accordingly, the MoCA baseband module 223 together with the WiFi baseband module 224 configures the system for WiFi communications. WiFi communications 320 occur during map-to-map interval 302. Shared resources are used for the WiFi communications during this time interval 302. As also illustrated in the example of FIG. 5, a WiFi access point can use a CTS-to-self 322 to "block off" a time period for MoCA communications. When the WiFi access point sends the CTS-to-self 322, other participating WiFi devices will interpret that as an indication that the sending access point is reserving the network for itself. Accordingly, the other WiFi devices on the network will refrain from communicating over the WiFi network. Accordingly, the shared resources are made available to the MoCA nodes of the MoCA network.

In the above-described example, MoCA is given a higher priority than WiFi because the decision for time division access is made based on the absence or presence of a MoCA RR. Likewise, through the use of the CTS-to-Self 322, the system can "hold off" WiFi transmissions in favor of MoCA operations. For example, the CTS can be used by a WiFi access point to "self block" WiFi communications and thus make the shared resources available for MoCA communications.

An example of this is illustrated in FIG. 5. CTS 325 is sent by the WiFi access point. This blocks all other WiFi devices from transmission during the defined time interval 307. Therefore, MoCA communications can resume at the beginning of interval 307. Because there was a MoCA RR, however, at the end of interval 307, the remainder 308 of the map-to-map interval 315 is free for WiFi communications. Accordingly, in some embodiments, the available resources can be switched between WiFi and MoCA opportunistically in sub-map-to-map intervals. In one embodiment, the maximum time that can be self blocked using a CTS for MoCA is 64 ms. Accordingly, a map-to-map interval 315 would be available for WiFi communications. However, as described above, CTS 325 blocks the period 307 for MoCA communications.

Figure 6:
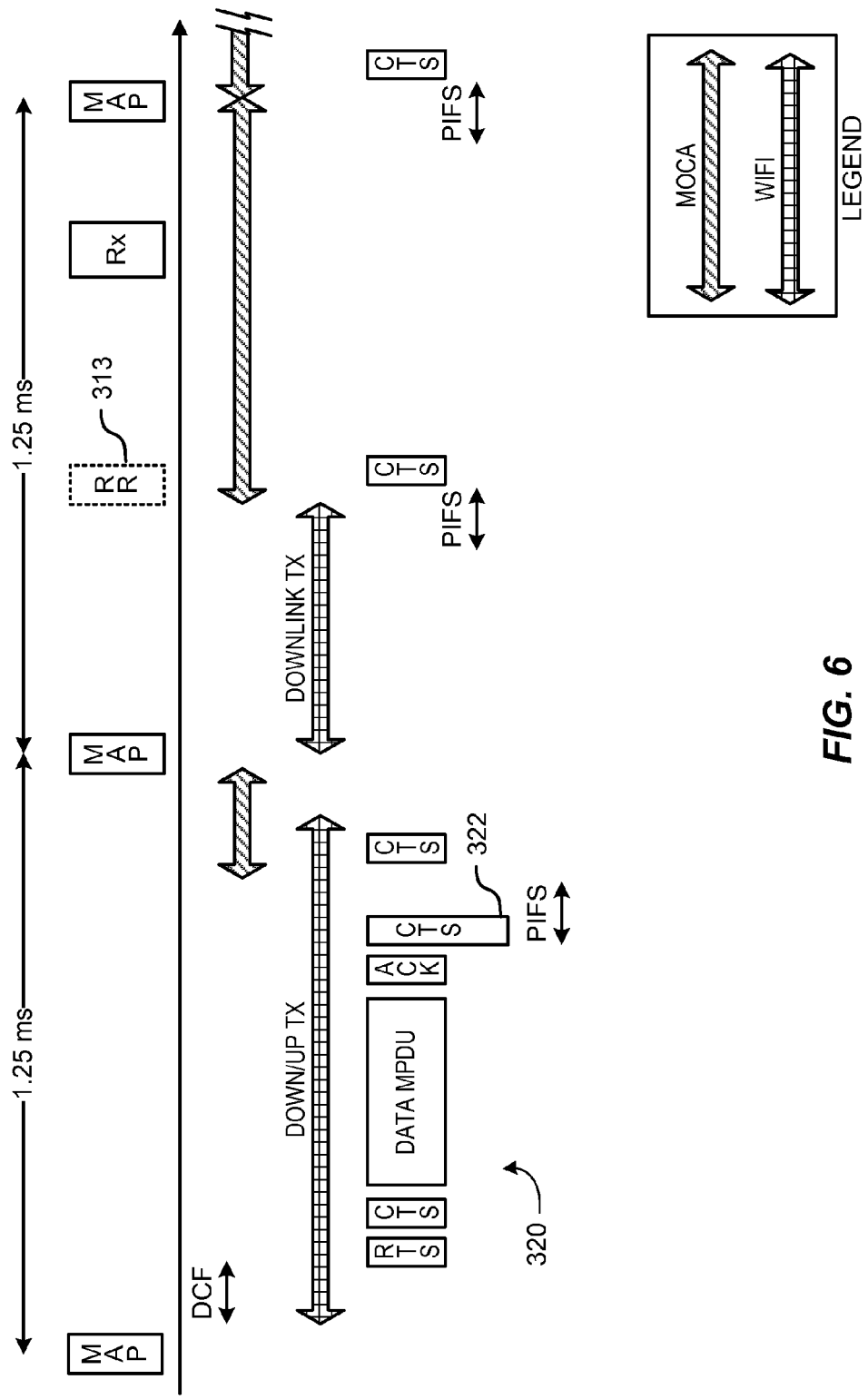
FIGS. 6 and 7 are a diagram illustrating an example of time division multiple access between WiFi and MoCA in accordance with embodiments of the systems and methods described herein.
Figure 7:
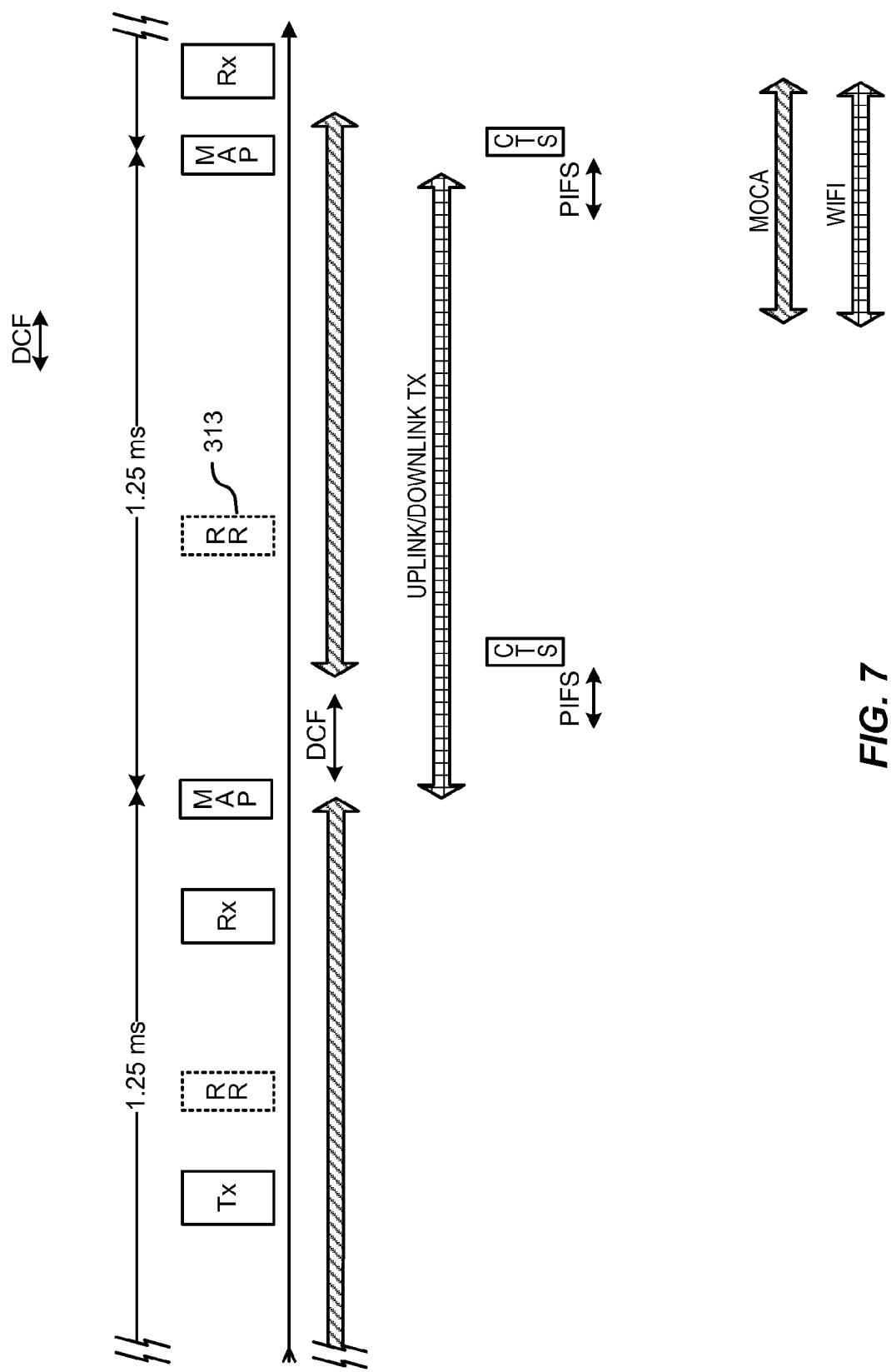

FIGS. 6 and 7 are diagrams illustrating an example of time division multiple access between WiFi and MoCA in accordance with embodiments of the systems and methods described herein. In WiFi, a transmission opportunity (TXOP) is a time interval during which a WiFi device is permitted to send frames of data. The transmission cannot exceed the maximum duration specified for the TXOP. If a frame is too large to fit in a single TXOP, it may be fragmented. In some embodiments, the maximum WiFi transmission opportunity length is set to be equal to, or substantially equal to, the minimum inter-MAP gap length. For MoCA, this is 200 microseconds. For synchronous MAP operations, in a scenario such as that illustrated in FIGS. 6 and 7, the inter-MAP gap length is 1.25 ms. Therefore, the TXOP limit is set to 1.25 ms or a number slightly less than 1.25 ms (e.g. 1.1 ms). For an asynchronous MAP, in a scenario such as that illustrated in FIGS. 6 and 7, the TXOP limit may be set to 0.65 ms.

As shown in FIGS. 6 and 7, downlink WiFi transmission (Tx) operations are opportunistic in some embodiments and mixed with MoCA Tx/receive (Rx). However, in the illustrated example, Uplink WiFi transmissions are scheduled only in the entire interval between adjacent MAPs. In other words, an Uplink WiFi transmission will only be scheduled if there are no MoCA communications during the entire interval between MAPs.

In some embodiments, the system is configured to monitor WiFi during WiFi available intervals to see if the system is being used. If a time interval is available for WiFi, but no WiFi transmission starts by a given time within that interval, no WiFi transmission is allowed to start up in that interval. This technique can be used to ensure that WiFi communications don't overrun the available time interval.

In various embodiments, the time is divided between MoCA and WiFi operations by giving priority to MoCA communications and allowing WiFi to use remaining bandwidth. For example, in some embodiments, the network bridge first evaluates the schedule for MoCA communications. For example, this can be accomplished by looking at the MoCA MAP. In MoCA operations, the NC schedules the nodes in the MAP. The bridge then determines from the MAP when MoCA communications are not scheduled. It is during these unscheduled times that the bridge allows the WiFi devices to communicate over the network and use shared resources on the bridge. During these unscheduled times, the WiFi devices use standard WiFi protocols to share this available time. This can be accomplished using, for example the Request-to-Send (RTS) and CTS messaging protocols. At the end of the reserved WiFi time, the access point sends a CTS-to-self notification to block other WiFi nodes from communicating. Because all the WiFi nodes receive this CTS, they remain silent during the blocked period (e.g., ≤64 ms in one embodiment) so that the MoCA devices can utilize the network and the shared resources.

Figure 8:
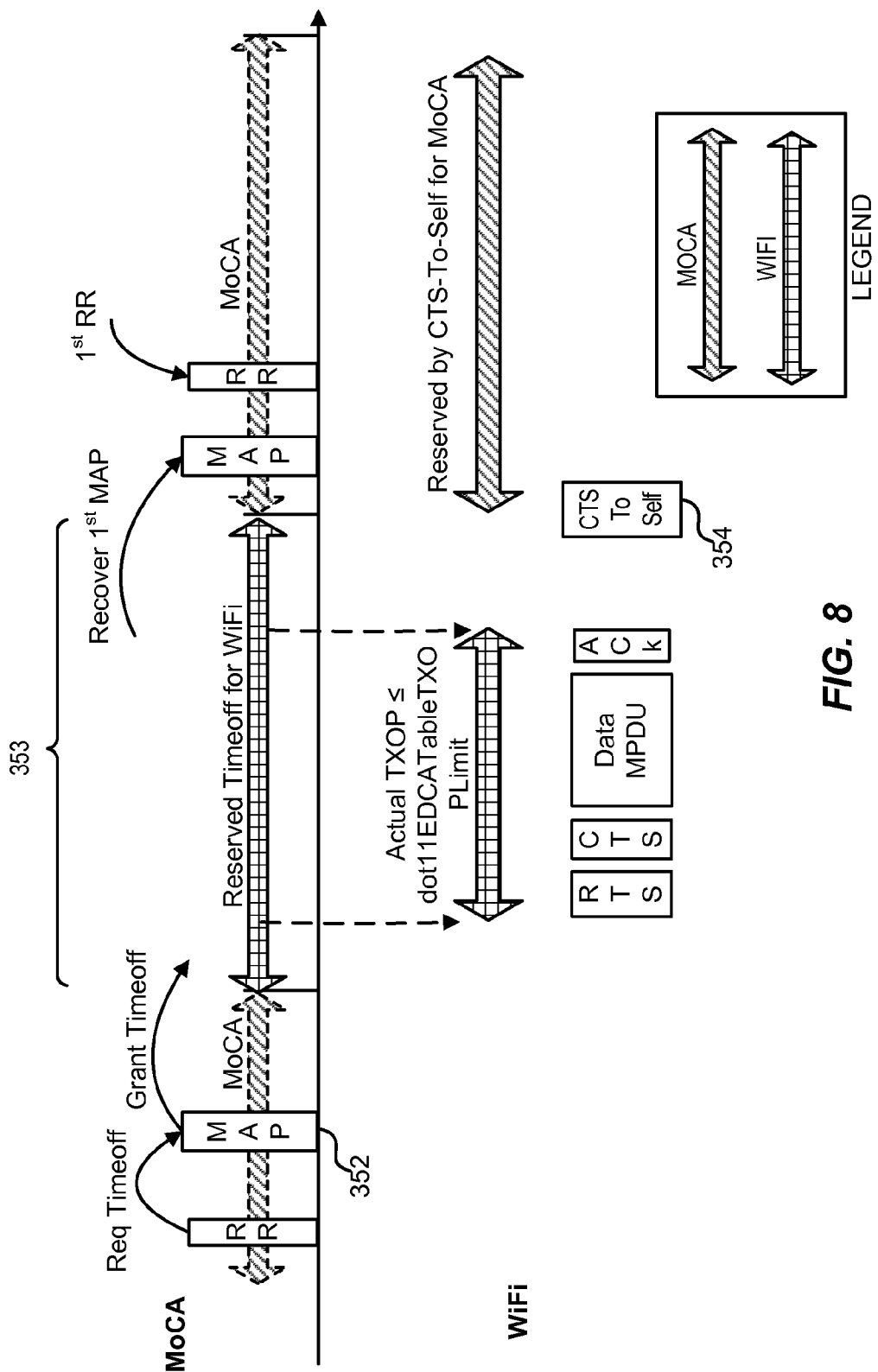
FIG. 8 is a diagram illustrating another example of time division multiple access between WiFi and MoCA in accordance with embodiments of the systems and methods described herein.

FIG. 8 is a diagram illustrating another example of time division multiple access between WiFi and MoCA in accordance with embodiments of the systems and methods described herein. An example of this is illustrated in FIG. 8, in which the network bridge determines from MAP 352 that no MoCA devices are transmitting during period 353. A MoCA Notice of Absence may be used to indicate to the MoCA devices to refrain from using MoCA on demand services. Period 353 is therefore reserved for WiFi communications. As illustrated, at the end of reserved period 353, the WiFi access point bridge sends a CTS 354 to reserve the communication network for MoCA traffic.

Figure 9:
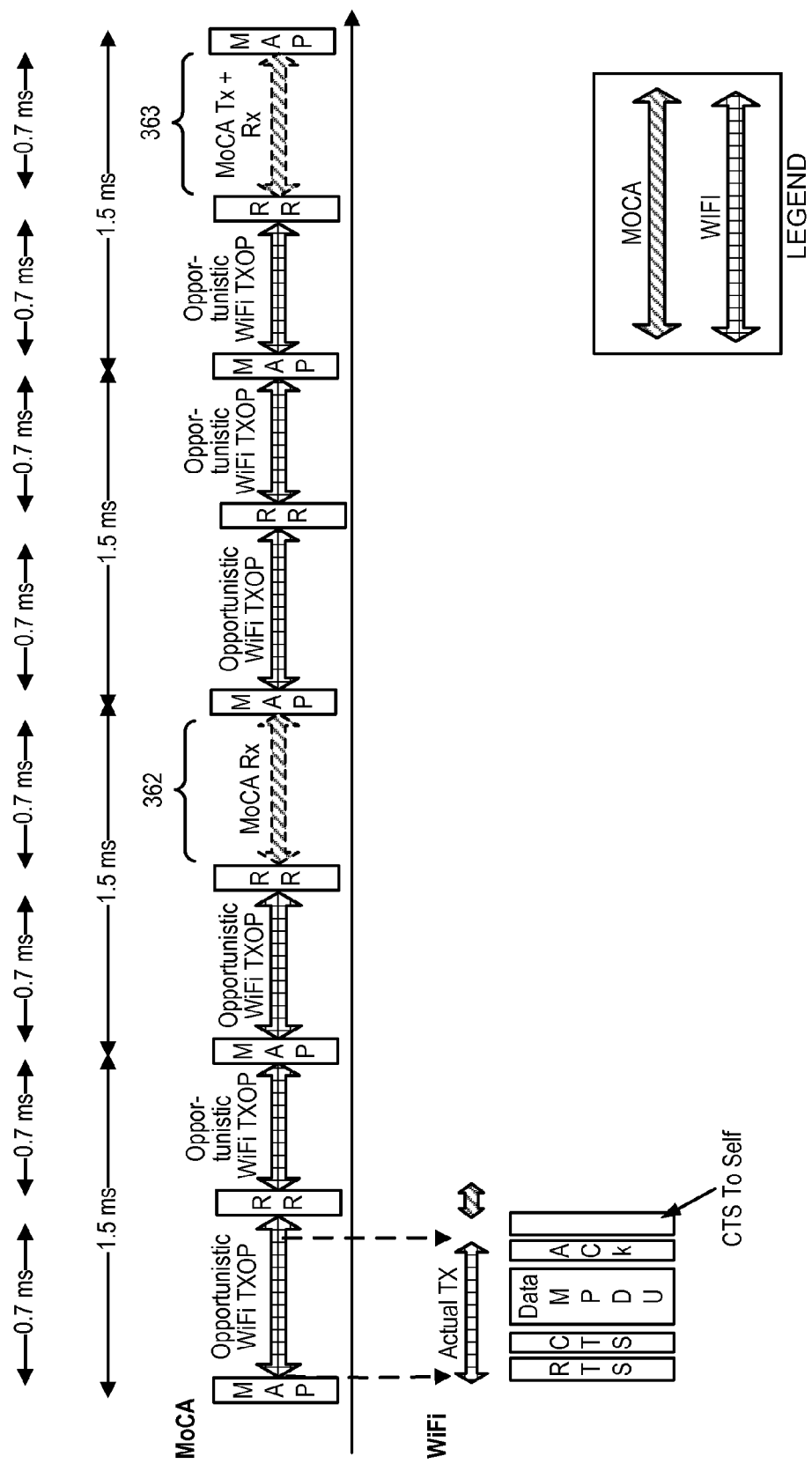
FIG. 9 is a diagram illustrating another example of time division multiple access between WiFi and MoCA in accordance with embodiments of the systems and methods described herein.

Another example another example of time division multiple access between WiFi and MoCA is illustrated in FIG. 9, in which sub-millisecond sharing is used. In this example, cycles that are not used for MoCA are designated as opportunistic windows for WiFi TXOP. As this example illustrates, the WiFi communications end in time for the bridge to receive the MAPs and the RRs. This is accomplished using CTS notifications by the access point. Because the network is free for the regularly scheduled MAPs and RRs, no changes to the MoCA protocol are required. In the illustrated example, intervals 362, 363 are reserved for MoCA communications. These intervals are scheduled using RRs as per conventional MoCA protocol so that sharing can be performed without altering MoCA nodes.

Figure 10:
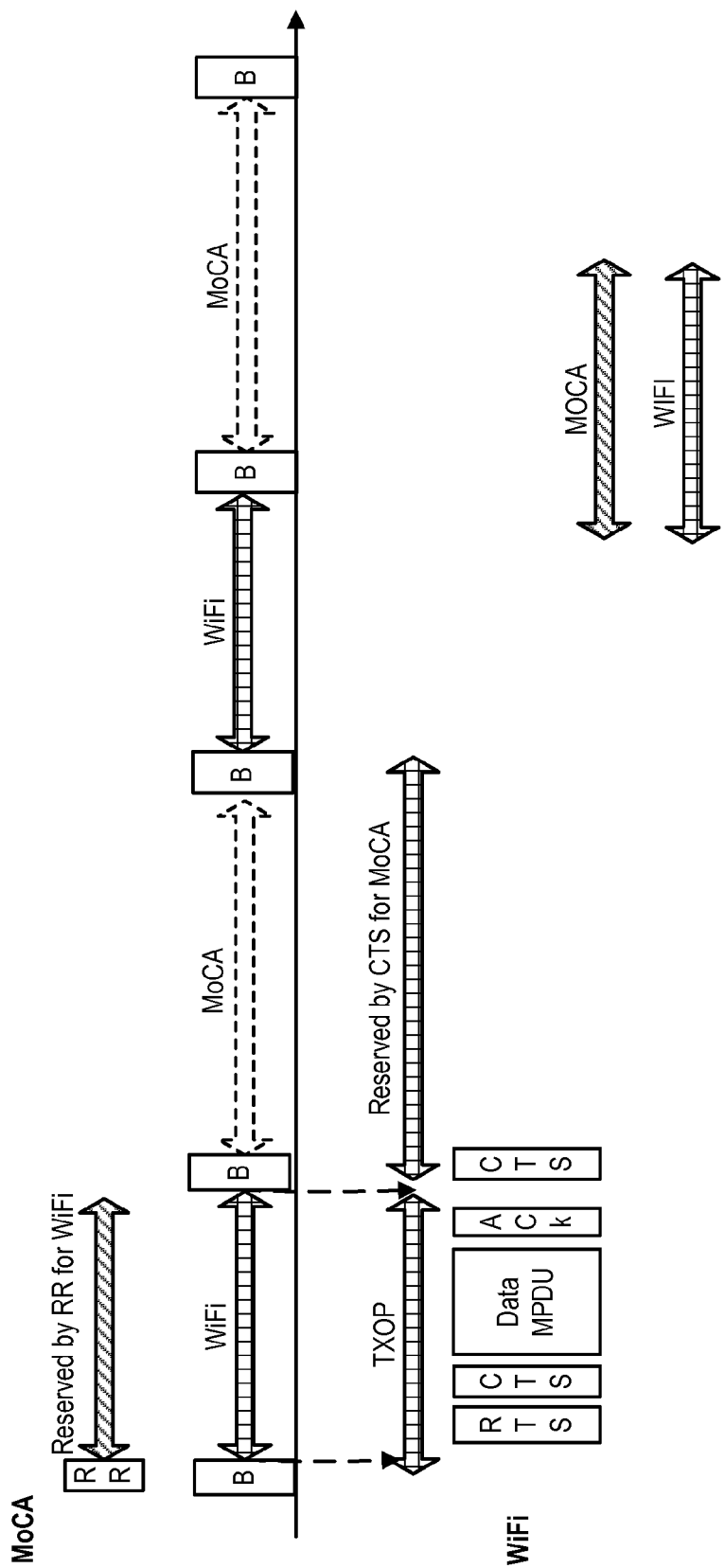
FIG. 10 is a diagram illustrating another example of time division multiple access between WiFi and MoCA in accordance with embodiments of the systems and methods described herein.

The example in FIG. 10 illustrates another example for time division sharing in accordance with the systems and methods described herein. As this example illustrates, and as previously discussed, the CTS-to-self message sent by the access point can be used to reserve the shared resources for WiFi communications. Similarly, the RR can be used by the bridge to reserve network time for WiFi communications. Because the bridge makes a reservation using the RR, the NC and other network devices ensure that the MoCA resources are available for the bridge. During this available time, the bridge allows the WiFi devices to communicate using the shared resources.

Figure 11:
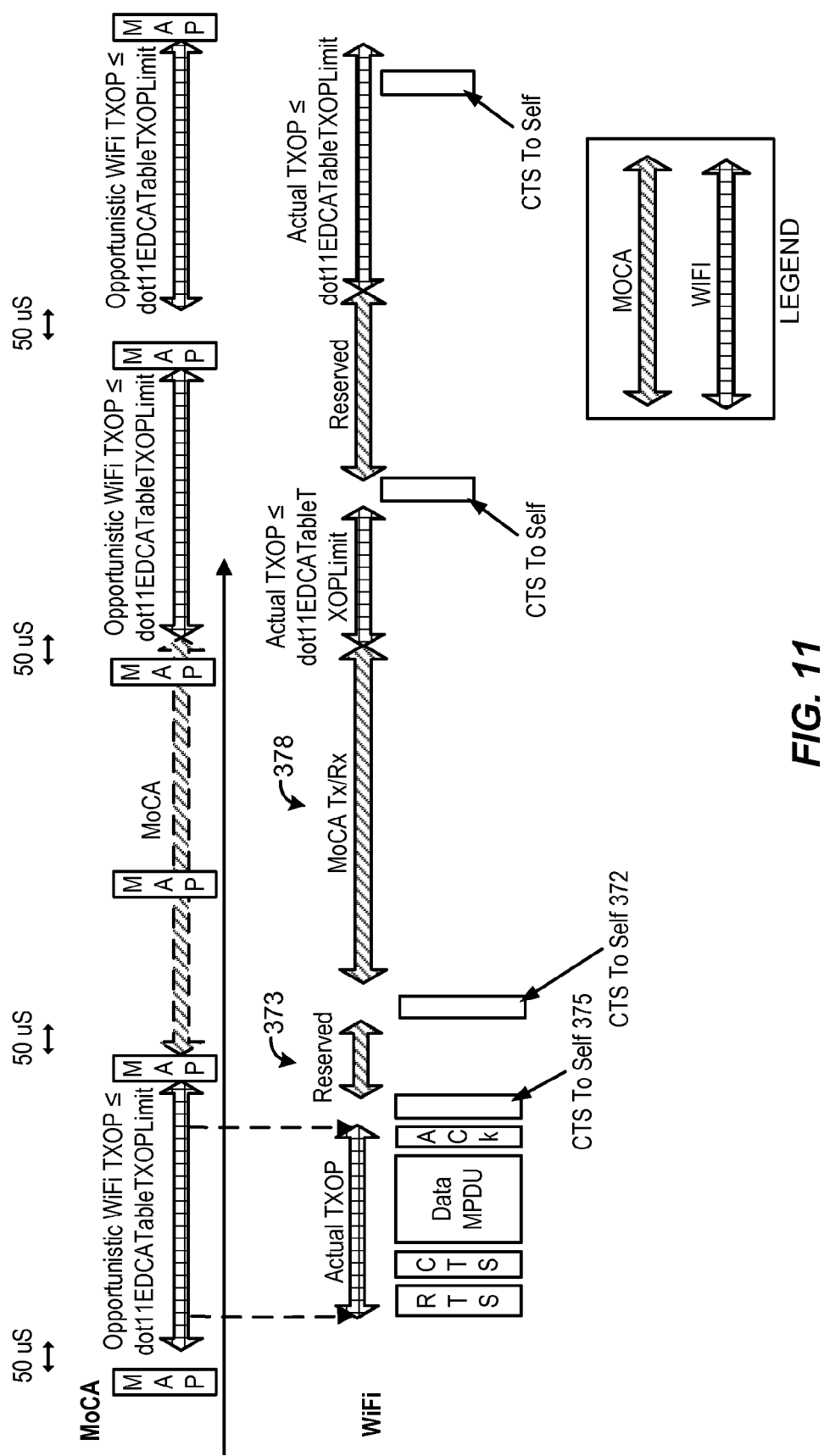
FIG. 11 illustrates an example embodiment that uses Clear-to-Send (CTS) notifications to ensure that the time for Media Access Plans (MAPs) is properly reserved for MoCA devices.

FIG. 11 illustrates an example embodiment that uses CTS notifications to ensure that the time for MAPs is properly reserved for MoCA devices. As seen in this example, the access point sends a CTS-to-self message 375 to reserve the time 373 for MAP 376 to occur on the MoCA network. CTS-to-self message 372 reserves the subsequent MoCA communication window 378.

In some applications, more than one bridge will be in communication with network nodes and with one another. Therefore, some embodiments permit coordination between bridges so the two access points can use the same frequency.

Figure 12:
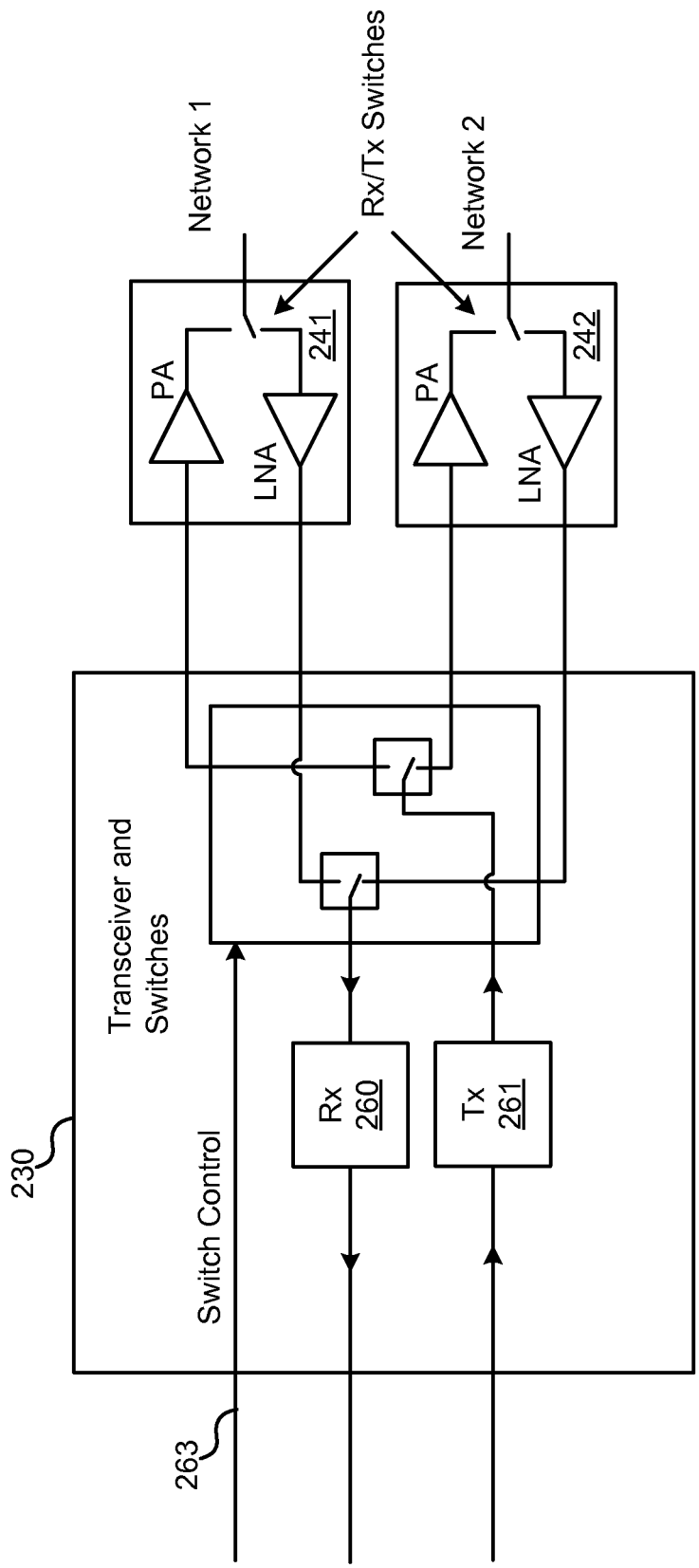
FIG. 12 is a diagram illustrating an example implementation for time multiplexing a transceiver between two networks in accordance with the systems and methods described herein.

FIG. 12 is a diagram illustrating an example implementation for time multiplexing a transceiver between two networks in accordance with the systems and methods described herein. FIG. 12 is described in terms of the example transceiver 230 discussed above with respect to FIG. 4. After reading this description, it will become apparent to one of ordinary skill in the art how this description can apply to other transceivers for time multiplexing between two networks. Referring now to FIG. 7, in this example, transceiver 230 includes receiver 260, transmitter 261 and switches 262. In some embodiments, receiver 260 and transmitter 261 are of a sufficiently wide bandwidth to accommodate the two networks over which they are to communicate. In other embodiments, blocks or components of receiver 260 and transmitter 261 can be switched in and out to allow operation at different frequency bands.

Switches 262 are used to switch receiver 260 and transmitter 261 to amplifiers 241 or amplifiers 242 as appropriate for communication on the MoCA network 251 or the WiFi network 252. As illustrated in FIG. 7, switches 262 are controlled by a switch control signal 263. In some embodiments, switch control signal 263 is generated by baseband components 221 to control the switches for the appropriate network with which the bridge is currently communicating. As discussed above with reference to FIGS. 5 and 6, baseband block 221 can be configured to determine and direct the shearing operation and the times at which the bridge will be communicating with a particular network. Accordingly, as part of this process, baseband block 221 is configured to generate the appropriate switch control signal 263 to switch the receiver 260 and transmitter 261 to the appropriate network coordination with the network in use at the time.

Figure 13:
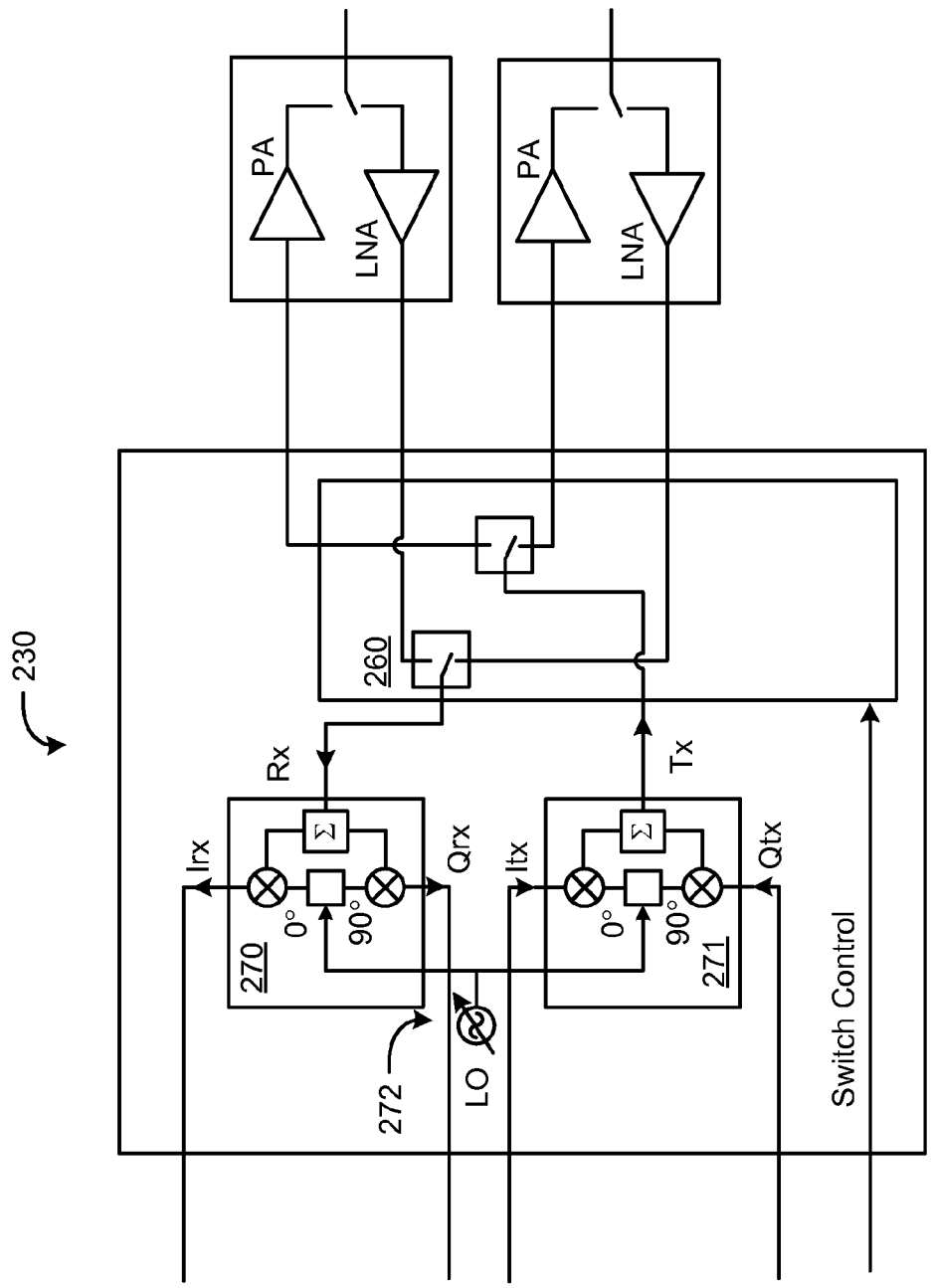
FIG. 13 is a diagram illustrating another example implementation of a shared transceiver in accordance with embodiments of the systems and methods described herein.

FIG. 13 is a diagram illustrating another example implementation of a shared transceiver 230 in accordance with embodiments of the systems and methods described herein. In the example illustrated in FIG. 13, a tunable local oscillator LO is provided to allow tuning of the receiver 270 and transmitter 271 to the appropriate conversion frequencies for the selected network communications. For example, where a zero-IF receiver and transmitter are implemented, the local oscillator 272 can be tuned in real-time or near real-time to downconvert the received signal to baseband in the case of receiver 270; or to upconvert the baseband to the appropriate part of frequency in the case of transmitter 271.

Figure 14:
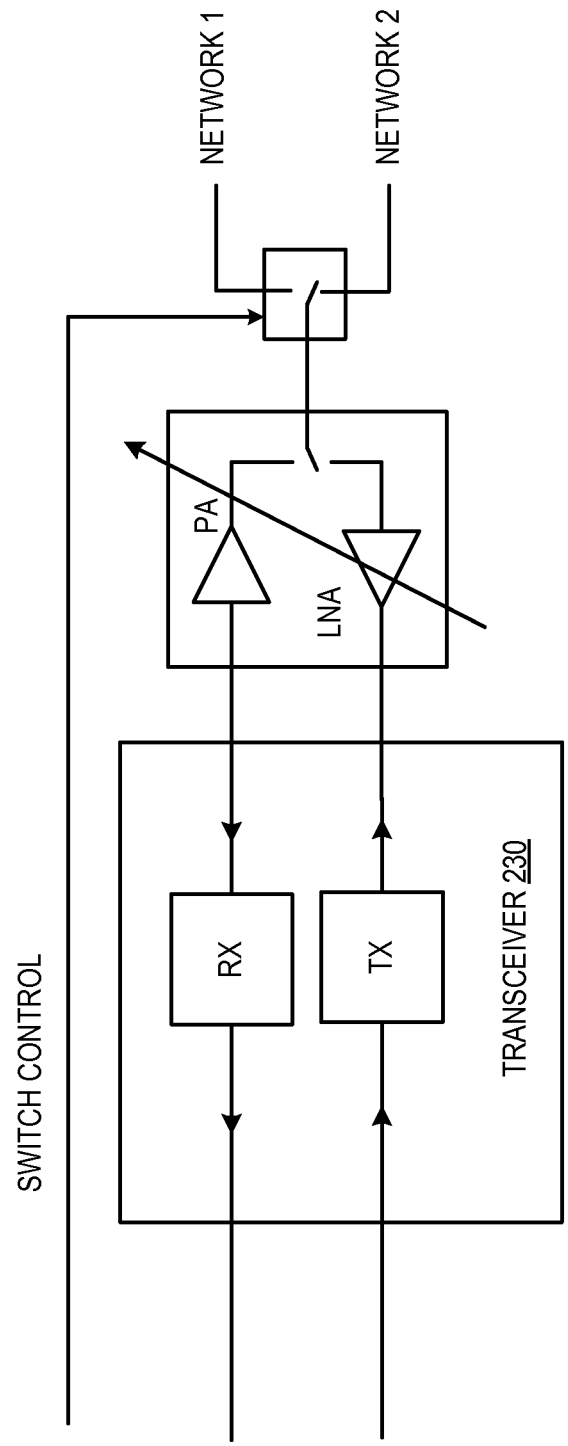
FIG. 14 is a diagram illustrating another example of resource sharing in accordance with embodiments of the systems and methods described herein.

FIG. 14 is a diagram illustrating another example of resource sharing in accordance with embodiments of the systems and methods described herein. Referring now to FIG. 10, in this example two amplifiers 290 are shared in addition to transceiver 230. In some embodiments, the amplifiers 290 can be tuned rapidly between the channels and bands as required to accommodate the operating frequencies of the selected network. In other embodiments, wideband amplifiers can be provided to cover both bands in all operating channels.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, Application Specific Integrated Circuits (ASICs), Programmable Logic Arrays (PLAs), Programmable Array Logics (PALs), Complex Programmable Logic Devices (CPLDs), Field Programmable Gate Arrays (FPGAs), logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 15:
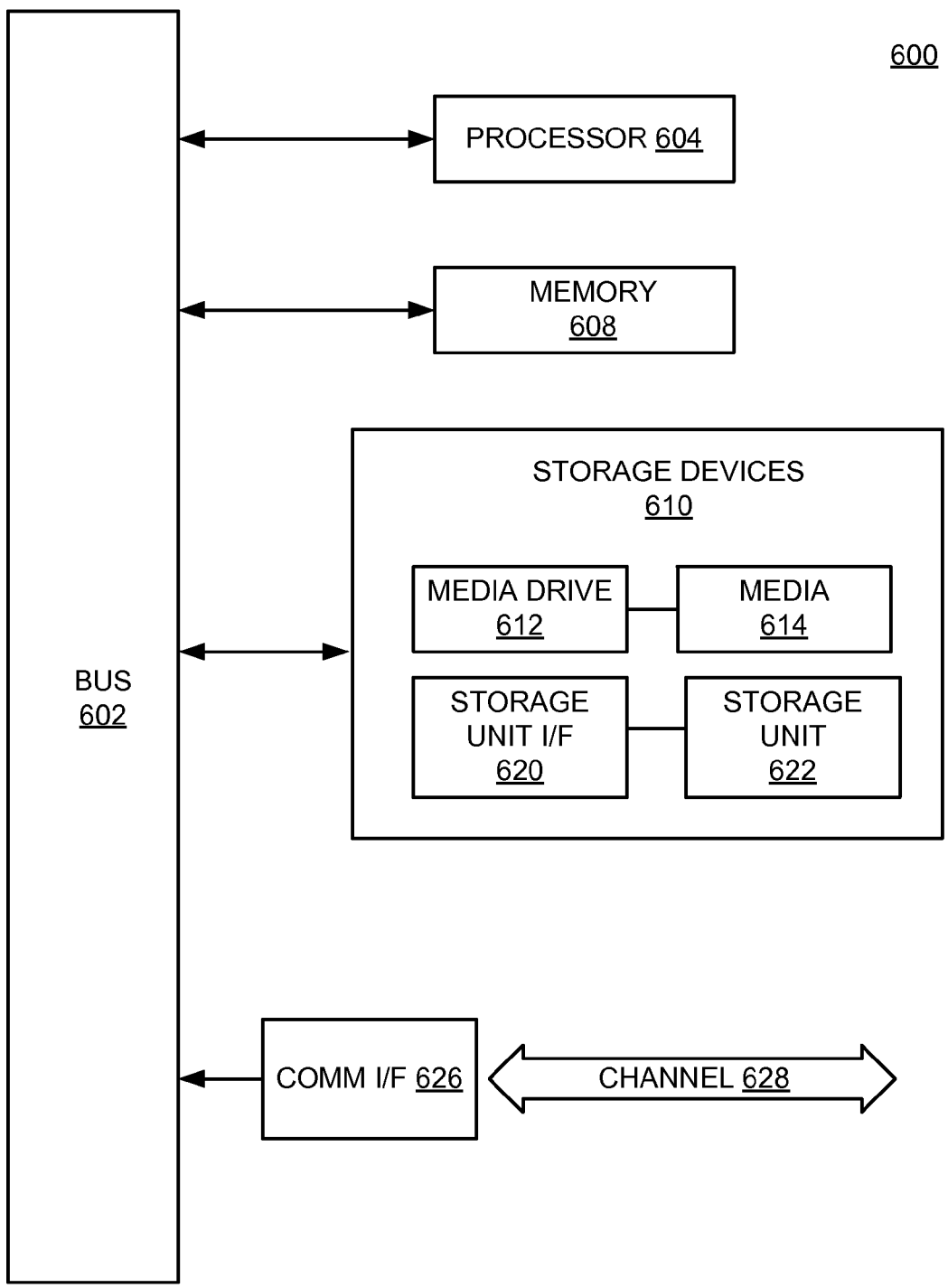
FIG. 15 is a diagram of an exemplary computing module that may be used in implementing features of embodiments of the disclosed methods and apparatus.

In one embodiment, when components or modules are implemented in whole or in part using software, these software elements can be implemented using any computing or processing module capable of carrying out the described functionality. One example of such a computing module is shown in FIG. 15. Various embodiments of the disclosed method and apparatus include this computing module 600. After reading this description, it will become apparent to a person skilled in the relevant art how to implement the disclosed method and apparatus using both this computing module and other computing modules or architectures as well.

Referring now to FIG. 15, in one embodiment, the computing module 600 may represent computing or processing capabilities found within: desktop, laptop, notebook computers, hand-held computing devices (Personal Data Assistants (PDAs), smart phones, cell phones, palmtops, etc.), mainframe computers, supercomputers, workstations, servers, or any other type of special-purpose or general-purpose computing devices, as may be desirable or appropriate to perform the described functionality for a given application or environment. The computing module 600 might also represent computing capabilities embedded within or otherwise available to a given device. For example, a computing module 600 might be found in or implemented by electronic devices such as digital cameras, navigation systems, cellular telephones, portable computing devices, modems, routers, Wireless Access Points (WAPs), terminals and other electronic devices that might include some form of processing capability.

The computing module 600 might include, for example, one or more processors, controllers, control modules, or other processing devices, such as a processor 604. The processor 604 might be implemented using a general-purpose or special-purpose processing engine such as, for example, a microprocessor, controller, or other control logic. In the illustrated example, the processor 604 is connected to a bus 602, although any communication medium can be used to facilitate interaction with other components of the computing module 600 or to communicate externally.

The computing module 600 might also include one or more memory modules, simply referred to herein as the main memory 608. In one embodiment, Random Access Memory (RAM) or other dynamic memory might be used for storing information and instructions to be executed by the processor 604. The main memory 608 might also be used for storing temporary variables or other intermediate information during execution of instructions to be executed by the processor 604. The computing module 600 might likewise include a Read Only Memory ("ROM") or other storage device coupled to bus 602 for storing information and instructions for the processor 604.

The computing module 600 might also include one or more mechanisms for information storage 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a Compact Disk (CD) or Digital Video Device (DVD) drive (Read (R) or Read/Write (RW)), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into the computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a Personal Computer Memory Card International Association (PCMCIA) slot and card, and other fixed or removable storage units 622 and interfaces 620 that allow software and data to be transferred from the storage unit 622 to the computing module 600.

The computing module 600 might also include a communications interface 624. Communications interface 624 might be used to allow software and data to be transferred between the computing module 600 and external devices. Examples of communications interface 624 might include a modem or soft modem, a network interface (such as an Ethernet, network interface card, WiMedia, IEEE 802.XX or other interface), a communications port (such as for example, a USB port, Infra-Red (IR) port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

It should be clear from the broad scope of processing and storage devices disclosed, that any devices that can perform the functions disclosed would be within the scope of the disclosed method and apparatus.

In this document, the terms "computer program medium" and "computer usable medium" are used to generally refer to physical storage media such as, for example, memory 608, storage unit 622, and media 614. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the disclosed method and apparatus as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

What is claimed is:

1. A network bridge configured to perform communications on a Multi-media over Coax Alliance ("MoCA") network and a WiFi network using shared network bridge resources, the network bridge comprising:
a processor;
a transceiver coupled to the processor and configured to operate in both the MoCA network and the WiFi network; and
a memory coupled to the processor on which is stored computer executable code to enable the processor to manage the functions of the MoCA network and the WiFi network and assign the shared network bridge resources to only one of the MoCA network or the WiFi network at any one time to allow for sharing of the shared network bridge resources, which when the stored program is executed by the processor, causes the network bridge to perform the operations of:
a) in a current access cycle of the MoCA network, receiving a Media Access Plan ("MAP") from a MoCA NC on the MoCA network and checking the MAP to determine whether the MoCA Network Coordinator ("NC") has scheduled MoCA communications in an upcoming MAP cycle;
b) in instances where the MAP indicates that the MoCA NC has scheduled MoCA communications in an upcoming MAP cycle, configuring the shared network bridge resources for MoCA communications;
c) in instances where the MAP indicates that the MoCA NC has not scheduled any MoCA communications in an upcoming MAP cycle, configuring the shared network bridge resources for WiFi communications; and
d) at the conclusion of a WiFi communication period, sending a Clear-to-Send ("CTS") to WiFi devices on the WiFi network and configuring the shared network bridge resources for WiFi communications;
wherein the shared network bridge resources comprise at least one of a baseband processor, memory, the transceiver, a power amplifier and a low noise amplifier.

2. The network bridge of claim 1, wherein checking the MAP to determine whether the MoCA NC has scheduled MoCA communications in an upcoming MAP cycle comprises parsing the MAP to determine a time period for scheduled MoCA communications.

3. The network bridge of claim 1, further comprising, upon configuration of the shared network bridge resources for WiFi communications checking for the occurrence of WiFi communications and, if WiFi communications do not occur within a predetermined time period, sending a second CTS to the WiFi devices on the WiFi network and configuring the shared network bridge resources for WiFi communications.

4. The network bridge of claim 3, wherein the predetermined time period is chosen such that if WiFi communications are commenced, they can be completed before the next scheduled MAP.

5. The network bridge of claim 1, further comprising, when the shared network bridge resources are configured for WiFi communications, sending a CTS before each MAP and RR to cease WiFi communications, and reconfiguring the shared network bridge resources for MoCA communications to allow communication of the MAPs and RRs among MoCA devices.

6. The network bridge of claim 1, further comprising, communicating with a second network bridge to coordinate WiFi communications by the bridges to avoid overlapping WiFi communications by the bridges.

7. A method for sharing resources for a network bridge configured to perform communications on a Multi-media over Coax Alliance ("MoCA") network and a WiFi network using the shared network bridge resources, the method comprising:
   a) in an access cycle of the MoCA network, receiving a Media Access Plan ("MAP") from a MoCA Network Coordinator ("NC") on the MoCA network and checking the MAP to determine whether the MoCA NC has scheduled MoCA communications in an upcoming MAP cycle;
   b) in instances where the MAP indicates that the MoCA NC has scheduled MoCA communications in an upcoming MAP cycle, configuring the shared network bridge resources for MoCA communications;
   c) in instances where the MAP indicates that the MoCA NC has not scheduled any MoCA communications in an upcoming MAP cycle, configuring the shared network bridge resources for WiFi communications; and
   d) at the conclusion of a WiFi communication period, sending a Clear-to-Send ("CTS") to WiFi devices on the WiFi network and configuring the shared network bridge resources for WiFi communications;
   wherein the shared network bridge resources comprise a transceiver configured to operate in both the MoCA network and the WiFi network;
   wherein the shared network bridge resources comprise at least one of a baseband processor, memory, a power amplifier and a low noise amplifier; and
   wherein the shared network bridge resources are assigned to only the MoCA network or to only the WiFi network at any one time.

8. The method of claim 7, wherein checking the MAP to determine whether the MoCA NC has scheduled MoCA communications in an upcoming MAP cycle comprises parsing the MAP to determine a time period for scheduled MoCA communications.

9. The method of claim 7, further comprising, upon configuration of the shared network bridge resources for WiFi communications checking for the occurrence of WiFi communications and, if WiFi communications do not occur within a predetermined time period, sending a second CTS to the WiFi devices on the WiFi network and configuring the shared network bridge resources for WiFi communications.

10. The method of claim 9, wherein the predetermined time period is chosen such that if WiFi communications are commenced, they can be completed before the next scheduled MAP.

11. The method of claim 7, further comprising, when the shared network bridge resources are configured for WiFi communications, sending a CTS before each MAP and a selected RR to cease WiFi communications, and reconfiguring the shared network bridge resources for MoCA communications to allow communication of the MAPs and selected RRs among MoCA devices.

12. The method of claim 7, further comprising, communicating with a second network bridge to coordinate WiFi communications by the bridges to avoid overlapping WiFi communications by the bridges.

13. A communication system, comprising:
   A Multi-media over Coax Alliance ("MoCA") network;
   a WiFi network;
   and shared network bridge resources comprising a transceiver configured to operate in both the MoCA network and the WiFi network; wherein the system is configured to:
   a) in an access cycle of the MoCA network, receive a Media Access Plan ("MAP") from a MoCA Network Coordinator ("NC") on the MoCA network and check the MAP to determine whether the MoCA NC has scheduled MoCA communications in an upcoming MAP cycle;
   b) in instances where the MAP indicates that the MoCA NC has scheduled MoCA communications in an upcoming MAP cycle, configure the shared network bridge resources for MoCA communications;
   c) in instances where the MAP indicates that the MoCA NC has not scheduled any MoCA communications in an upcoming MAP cycle, configure the shared network bridge resources for WiFi communications; and
   d) at the conclusion of a WiFi communication period, send a Clear-to-Send ("CTS") to WiFi devices on the WiFi network and configure the shared network bridge resources for WiFi communications:
   wherein the shared network bridge resources further comprise at least one of a baseband processor, memory, a power amplifier and a low noise amplifier; and
   wherein the shared network bridge resources are assigned to only one of the MoCA network or the WiFi network at any one time.

14. The system of claim 13, wherein the step of checking the MAP to determine whether the MOCA NC has scheduled MoCA communications in an upcoming MAP cycle comprises parsing the MAP to determine a time period for scheduled MoCA communications.

15. The system of claim 13 is further configured to, upon configuration of the shared network bridge resources for WiFi communications, check for the occurrence of WiFi communications and, if WiFi communications do not occur within a predetermined time period, send a second CTS to the WiFi devices on the WiFi network and configure the shared network bridge resources for WiFi communications.

16. The system of claim 15, wherein the predetermined time period is chosen such that if WiFi communications are commenced, they can be completed before the next scheduled MAP.

17. The system of claim 13 is configured to, when the shared network bridge resources are configured for WiFi communications, send a CTS before each MAP and a selected RR to cease WiFi communications, and reconfigure the shared network bridge resources for MoCA communications to allow communication of the MAPs and selected RRs among MoCA devices.

* * * * *